United States Patent
Bonnett et al.

(10) Patent No.: US 9,455,659 B2
(45) Date of Patent: Sep. 27, 2016

(54) SYSTEMS AND METHODS FOR CONTROLLING HIGH SPEED MOTOR

(71) Applicant: Hamilton Sundstrand Space Systems International, Inc., Windsor Locks, CT (US)

(72) Inventors: Scott C. Bonnett, Chicago, IL (US); Michael Carbone, Rockford, IL (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 57 days.

(21) Appl. No.: 14/500,377

(22) Filed: Sep. 29, 2014

(65) Prior Publication Data

US 2016/0094173 A1  Mar. 31, 2016

(51) Int. Cl.
*H02P 21/00* (2016.01)
*H02P 1/00* (2006.01)

(52) U.S. Cl.
CPC ............ *H02P 21/0089* (2013.01); *H02P 1/00* (2013.01); *H02P 21/0035* (2013.01)

(58) Field of Classification Search
CPC .......... H02P 21/00; H02P 27/04; B62D 6/00

USPC ............ 318/400.01, 400.02, 400.14, 400.15, 318/700, 701, 721, 799, 430, 432, 400.32, 318/400.4, 400.21, 400.22, 800, 801; 388/800, 811, 928.1
See application file for complete search history.

(56) References Cited

U.S. PATENT DOCUMENTS

| | | | | |
|---|---|---|---|---|
| 8,179,068 B2 * | 5/2012 | Yuuki | ................ | H02K 1/2766 318/432 |
| 8,330,404 B2 * | 12/2012 | Sakai | .................... | H02K 1/276 29/426.5 |
| 8,395,336 B2 * | 3/2013 | Lai | ...................... | H02P 21/0089 318/400.02 |
| 2013/0013154 A1 * | 1/2013 | Aoki | ..................... | B62D 5/046 701/42 |

* cited by examiner

*Primary Examiner* — Antony M Paul
(74) *Attorney, Agent, or Firm* — Locke Lord LLP; Scott D. Wofsy; Daniel J. Fiorello

(57) ABSTRACT

A method for controlling an electric motor includes inputting a quadrature-axis current ($I_q$) and a direct-axis current ($I_d$) into an electric motor, receiving speed feedback indicative of the speed of the electric motor, determining whether the speed of the electric motor increases given the input $I_q$, and controlling the $I_d$ to increase the speed of the electric motor by selectively weakening the electromagnetic field if the speed of the electric motor does not increase given the input $I_q$.

13 Claims, 3 Drawing Sheets

SYSTEMS AND METHODS FOR CONTROLLING HIGH SPEED MOTOR

BACKGROUND

1. Field

The present disclosure relates to electric motors, more specifically to control methods for high speed motors.

2. Description of Related Art

When a brushless 3-phase DC motor is required to meet both low speed and high speed operating points, the motor is typically designed so that the required low speed torque is achieved with the allowable amount of phase current. This leads to a light weight motor but also a relatively high motor back emf (bemf) constant which may prevent the motor from being able to meet the high speed requirement.

A common solution to this problem is to introduce a field weakening component on the direct axis (d-axis) to the motor phase current during high speed operation. Direct axis current ($I_d$) counteracts the bemf caused by the rotor magnets, thus allowing the motor to spin faster at a given level of supply voltage and load. The $I_d$ current creates heat in the motor but does not produce useful torque. This approach effectively reduces the motor bemf voltage so that more net voltage is available to drive quadrature axis (q-axis) current ($I_q$) which produces useful motor torque.

The field weakening current can be either controlled directly, as in the case of field oriented control (FOC), or indirectly by controlling the rotor phase advance. Phase advance is the angular amount by which the motor current is switched on ahead of where it normally would be based on motor shaft position, which can be calculated as arctan ($I_d/I_q$). Phase advance beyond 90 degrees can cause torque reversal and associated unstable operation.

FOC is a motor current control method that uses the Clarke mathematical transform to convert the three measurable motor phase currents into theoretical, direct, and quadrature axis currents. The transform is based around the angle of the motor shaft, so during operation at constant speed and load, the resulting $I_d$ and $I_q$ currents are constant, even though the three phase currents are alternating at high frequency. This characteristic makes the FOC method useful for directly controlling the $I_d$ and $I_q$ components of motor phase current.

Traditional methods for specifying $I_d$ use a table with speed as the independent variable. Usually with this method $I_d$ is not used until motor speed has increased beyond the low speed operating point. Typically $I_d$ is then increased linearly up to a maximum value which is attained at a speed less than the high speed design point.

The open loop nature of this control has the drawback that it introduces an unstable (positive feedback) character into the speed control. For example, as speed increases, $I_d$ increases, which leads to additional speed, etc. Also, for loads less than the design point, this method will maintain the design point level of $I_d$ current, which will be more than is needed, thus leading to higher phase current, more motor heating, lower efficiency, and excessive phase advance. Additionally, for loads greater than the design point, this method will maintain the design point level of $I_d$ current, which will be less than is needed, thus leading to speed droop. If speed droops far enough, the method will encounter the low speed to high speed transition portion of the table which will cause speed to increasingly droop with positive feedback.

Such conventional methods and systems have generally been considered satisfactory for their intended purpose. However, there is still a need in the art for more efficient motor control systems and methods. The present disclosure provides a solution for this need.

SUMMARY

In at least one aspect of this disclosure, a method for controlling an electric motor includes inputting a quadrature-axis current ($I_q$) and a direct-axis current ($I_d$) into an electric motor, receiving speed feedback indicative of the speed of the electric motor, determining whether the speed of the electric motor increases given the input $I_q$, and controlling the $I_d$ to increase the speed of the electric motor by selectively weakening the electromagnetic field if the speed of the electric motor does not increase given the input $I_q$.

The method can further include increasing the $I_q$ until the speed of the electric motor no longer increases if the speed of the electric motor does increase with the input $I_q$. The method can further include reducing the $I_q$ by a first increment until a drop in the speed of the electric motor is received if the speed of the electric motor does not increase with the input of the $I_q$ and before controlling the $I_d$ to increase the speed of the motor. The method can further include increasing the $I_q$ using a second increment that is smaller than the first increment that the $I_q$ was reduced with until the speed of the motor does not increase over a threshold value, after a feedback indicative of a drop in speed of the electric motor is received. The method can further include reducing and increasing the $I_q$ again in increasingly smaller increments until a suitable number of oscillations have occurred. In some embodiments, the $I_q$ and the $I_d$ are not controlled simultaneously.

The method can include increasing the $I_d$ until the speed of the electric motor is maximized to the point that it no longer increases. The method can include increasing the $I_d$ up to a maximum $I_d$ to prevent demagnetization and/or phase advance limitations. It is also contemplated that the method can further include receiving a speed set point of motor speed and modifying the $I_d$ and/or the $I_q$ to reach the speed set point. The method can include automatically reducing (hereafter referred to as bleeding off) excess $I_d$ to minimize the amount of $I_d$ being applied to reach the speed set point.

In at least one aspect of this disclosure, a non-transitory computer readable medium can store computer executable instructions, the computer executable instructions including a method as describe above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
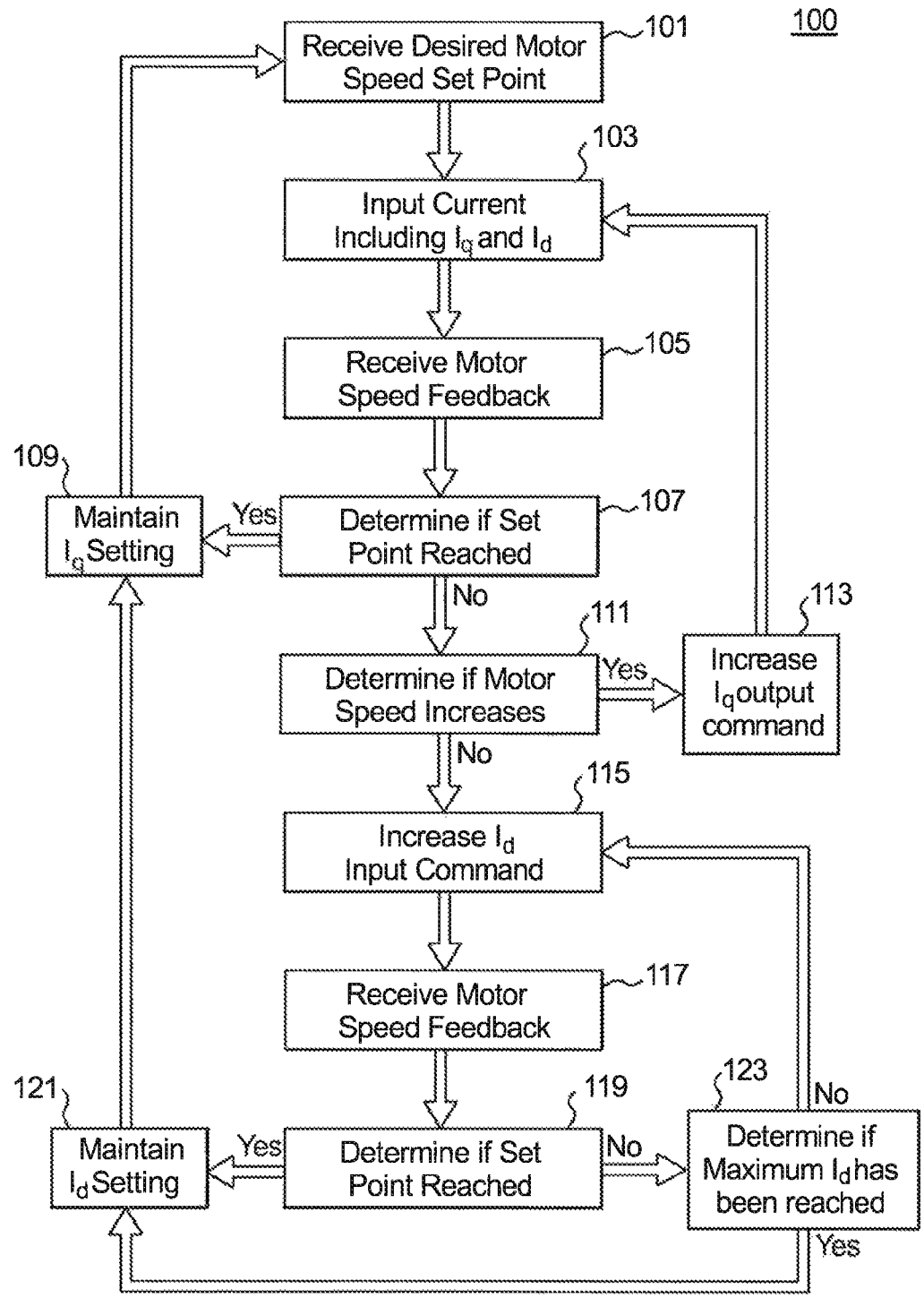
FIG. 1 is a flowchart of an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. The systems and methods described herein can be used to control an electric motor at high speed to increase efficiency thereof.

Figure 2:
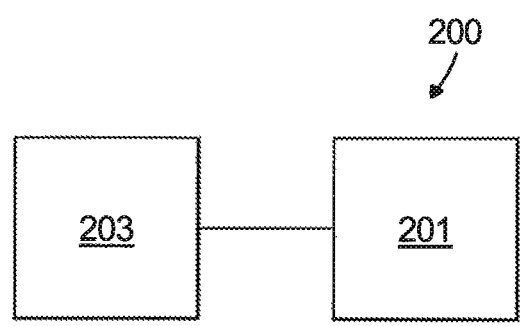
FIG. 2 is a schematic illustration of an embodiment of a system in accordance with this disclosure, showing a motor connected to a control system.

In at least one aspect of this disclosure, referring to FIGS. 1 and 2, the method 100 for controlling any suitable electric motor (e.g., motor 201 of FIG. 2) can include receiving a speed set point for the motor speed (e.g., that is input by control system 203 which is operatively connected to motor 201). At block 103, quadrature-axis current ($I_q$) and a direct-axis current ($I_d$) can be input into the electric motor 201.

At block 105, speed feedback that is indicative of the speed of the electric motor 201 is received. For example, any suitable sensor or method may be employed and connected to control system 203 to determine the operating speed of motor 201.

At this point, in embodiments, the speed of the motor 201 can be checked against the set point of speed to determine if the set point has been reached at block 107. If the set point has been reached, the present $I_q$ setting can be maintained to loop the method 100 and maintain the set speed until the set speed is changed or the motor load changes.

If the set point has not been reached by the present input of $I_q$, an increase in speed of the electric motor 201 increases given the input $I_q$ can be determined at block 111. In some embodiments, if the speed of the electric motor 201 did increase over a previous motor speed (e.g., an initial speed or previous input speed), then the $I_q$ can be increased again at block 113 and recycle to block 103 until no increase is seen and/or a maximum $I_q$ is reached.

It is contemplated that the method can further include reducing the $I_q$ by a first increment until a drop in the speed of the electric motor 201 is received if the speed of the electric motor 201 does not increase with the input of the $I_q$ and before controlling the $I_d$ to increase the speed of the motor 201. The method can further include increasing the $I_q$ using a second increment that is smaller than the first increment that the $I_q$ was reduced with until the speed of the motor 201 does not increase over a suitable threshold value, after a drop in speed of the electric motor 201 is received. The method can further include reducing and increasing the $I_q$ again in increasingly smaller increments until a suitable number of oscillations have occurred.

Referring back to block 107, if the motor speed does not increase, then further input of $I_q$ can be halted (since it would not tend to further raise the speed of the motor) and the $I_d$ can be controlled at block 115 to thereafter increase the speed of the electric motor 201 by selectively weakening the electromagnetic field. In at least some embodiments, the $I_q$ and the $I_d$ will not be controlled simultaneously such that the current control switches from $I_q$ control to $I_d$ control.

In some embodiments, the method 100 can include block 117, the motor speed feedback can be received again to determine the effect of modifying (e.g., increasing) the $I_d$. At block 119, it can be determined whether the set point has been reached. If not, in some embodiments, the method can include block 123 to determine if a maximum $I_d$ has been reached to prevent damage to the motor 201 or components thereof (e.g., to prevent demagnetization and/or exceeding phase advance limitations). In other embodiments, the method 100 can further include increasing the $I_d$ until the speed of the electric motor 201 is maximized to the point that the speed no longer increases.

If the set point or other suitable speed has been reached at block 119, the $I_d$ can be maintained at block 121 until the desired set speed is changed or the motor load changes. The method can also include bleeding off excess $I_d$ to minimize the amount of $I_d$ being applied to reach the speed set point.

In some embodiments, it is possible that the set point speed will be attained but with excessive electromagnetic field weakening due to greater amounts of $I_d$ current than is necessary. This condition results in lower motor efficiency because the excess $I_d$ current produces heat but no useful torque. The method can include automatic reduction (referred to as bleeding off herein) of $I_d$ current so as to insure that only the minimum amount of $I_d$ current is used in order to attain the set point speed. This can be accomplished by a suitable modification of the integral component of the proportional integral control of $I_d$ current. Specifically, the integral component of the $I_d$ current can be augmented with a negative feedback term which reduces the integral action automatically to the point at which the set point speed is attained to within a tolerance. Thus, via the tunable gains of the proportional+integral $I_d$ current control and a bleed feedback gain, the set point speed can be maintained within an acceptable tolerance range.

Any suitable rearrangement, addition, and/or removal of blocks, and/or portions thereof, or any other suitable portions of a method as disclosed herein, is contemplated.

Figure 3:
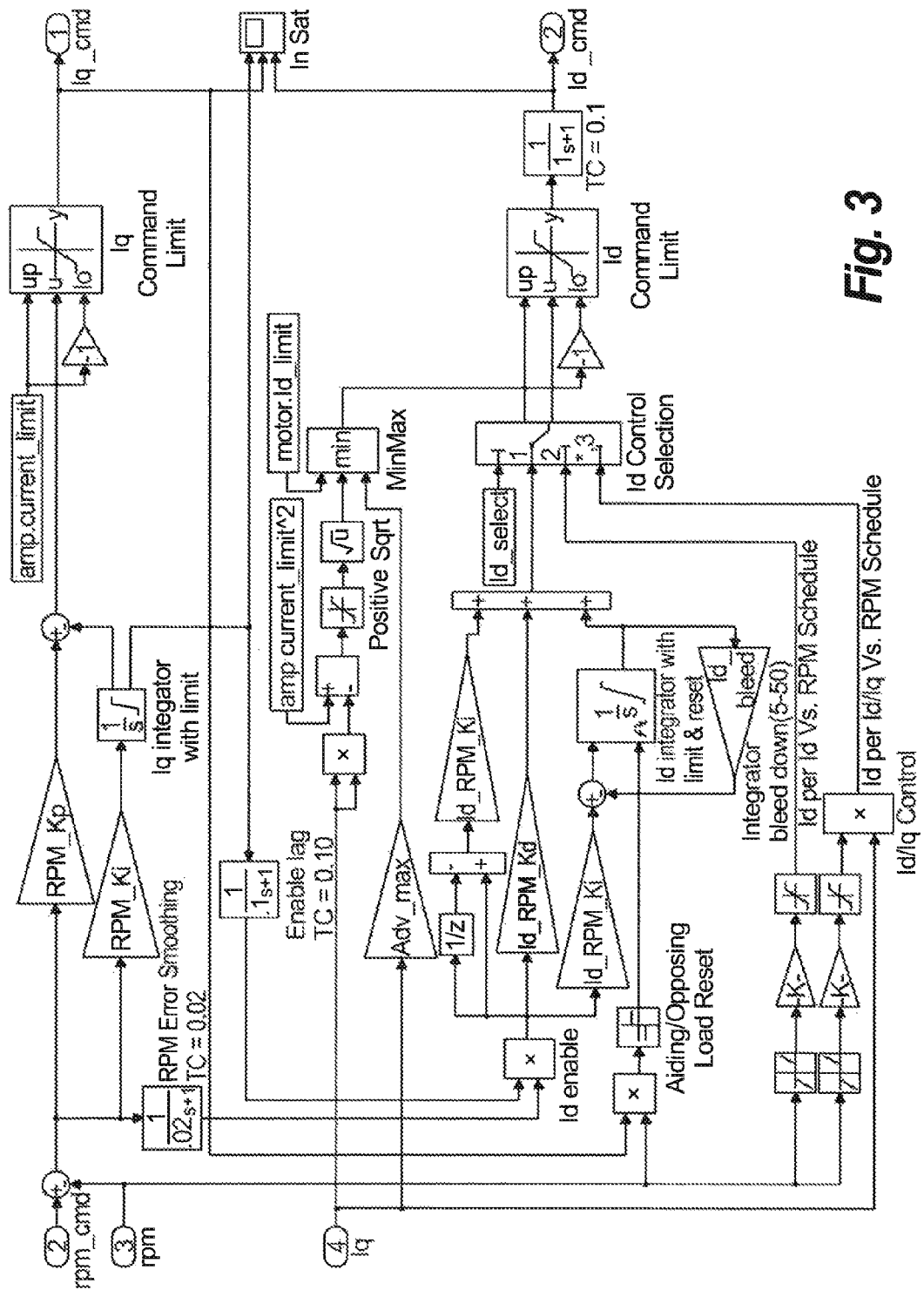
FIG. 3 is a schematic block diagram of an embodiment of a speed control in accordance with this disclosure.

In at least one aspect of this disclosure, a non-transitory computer readable medium can store computer executable instructions, the computer executable instructions including any suitable method as disclosed herein. For example, the control system 203 can include a hard drive storing a suitable software configured to perform methods as disclosed herein. Any other suitable hardware and/or software can be utilized to implement the methods and/or portions thereof as disclosed herein. For example, FIG. 3 shows a specific example of an embodiment of a method employed in a logical diagram.

The methods and systems of the present disclosure, as described above and shown in the drawings, provide for methods and systems with superior properties including efficient high speed motor control. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for controlling an electric motor, comprising:
   inputting a quadrature-axis current ($I_q$) and a direct-axis current ($I_d$) into an electric motor;
   receiving speed feedback indicative of the speed of the electric motor;
   determining whether the speed of the electric motor increases given the input $I_q$; and
   controlling the $I_d$ to increase the speed of the electric motor by selectively weakening the electromagnetic field if the speed of the electric motor does not increase given the input $I_q$; and
   reducing the $I_q$ by a first increment until a drop in the speed of the electric motor is received if the speed of the electric motor does not increase with the input of the $I_q$ and before controlling the $I_d$ to increase the speed of the motor.

2. The method of claim 1, further comprising increasing the $I_q$ until the speed of the electric motor no longer increases if the speed of the electric motor does increase with the input $I_q$ before controlling the $I_d$ to increase the speed of the motor.

3. The method of claim 1, further comprising increasing the $I_q$ using a second increment that is smaller than the first increment that the $I_q$ was reduced with until the speed of the motor does not increase over a threshold value, after a drop in speed of the electric motor is received.

4. The method of claim 3, further comprising reducing and increasing the $I_q$ again in increasingly smaller increments until a suitable number of oscillations have occurred.

5. The method of claim 1, wherein the $I_q$ and the $I_d$ are not controlled simultaneously.

6. The method of claim 1, further comprising increasing the $I_d$ until the speed of the electric motor is maximized to the point that it no longer increases.

7. The method of claim 1, further comprising increasing the $I_d$ up to a maximum $I_d$ to prevent demagnetization and/or phase advance limitations.

8. The method of claim 1, further comprising receiving a speed set point of motor speed and modifying the $I_d$ and/or the $I_q$ to reach the speed set point.

9. The method of claim 8, further comprising bleeding off excess $I_d$ to minimize the amount of $I_d$ being applied to reach the speed set point.

10. A non-transitory computer readable medium storing a computer executable instructions, the computer executable instructions including:

inputting a quadrature-axis current ($I_q$) and a direct-axis current ($I_d$) into an electric motor;

receiving speed feedback indicative of the speed of the electric motor;

determining whether the speed of the electric motor increases given the input $I_q$; and controlling the $I_d$ to increase the speed of the electric motor by selectively weakening the electromagnetic field if the speed of the electric motor does not increase given the input $I_q$; and reducing the $I_q$ by a first increment until a drop in the speed of the electric motor is received if the speed of the electric motor does not increase with the input of the $I_q$ and before controlling the $I_d$ to increase the speed of the motor.

11. The non-transitory computer readable medium of claim 10, wherein the computer executable instructions further comprise increasing the $I_q$ until the speed of the electric motor no longer increases if the speed of the electric motor does increase with the input $I_q$ before controlling the $I_d$ to increase the speed of the motor.

12. The non-transitory computer readable medium of claim 10, wherein the computer executable instructions further comprise increasing the $I_q$ using a second increment that is smaller than the first increment that the $I_q$ was reduced with until the speed of the motor does not increase over a threshold value, after a drop in speed of the electric motor is received.

13. The non-transitory computer readable medium of claim 10, wherein the computer executable instructions further comprise receiving a set point of motor speed, wherein the $I_d$ is modified to reach the set point.

* * * * *